S. PATRICK.
Heating Carving Table.
No. 46,491.  Patented Feb. 21, 1865.
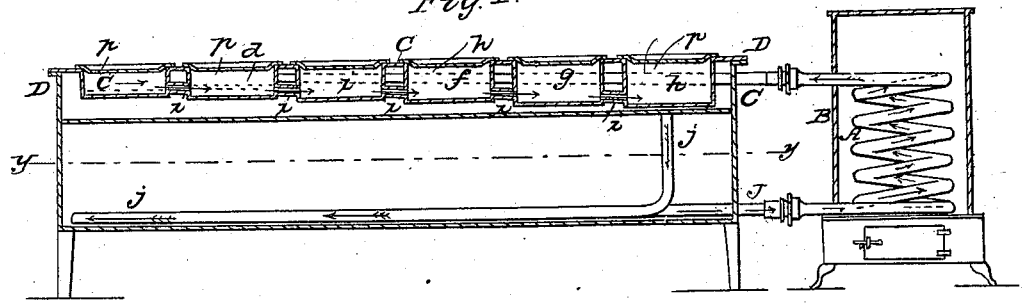
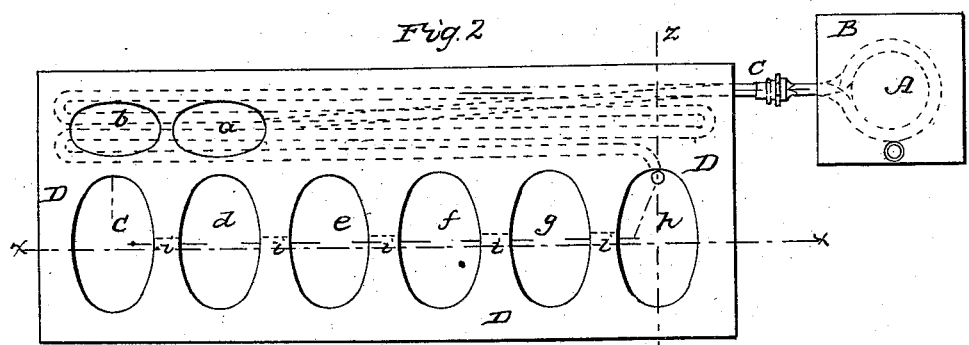
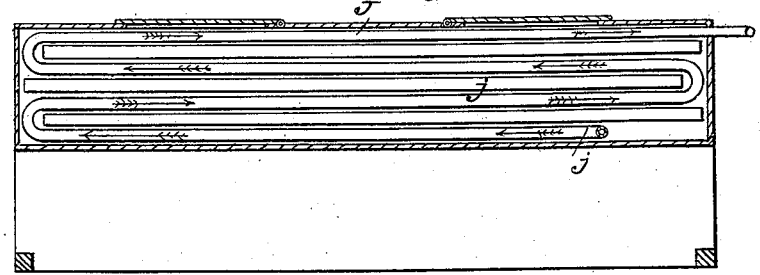
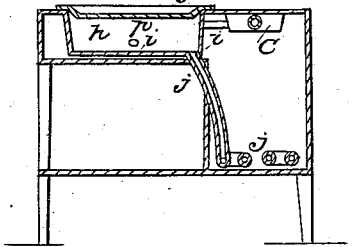
Witnesses
R. T. Campbell
E. Schafer
Inventor
Samuel Patrick
by his attys
Mason Fenwick & Lawrence

UNITED STATES PATENT OFFICE.

SAMUEL PATRICK, OF GALESBURG, ILLINOIS.

HEATING CARVING-TABLES.

Specification forming part of Letters Patent No. 46,491, dated February 21, 1865.

*To all whom it may concern:*

Be it known that I, SAMUEL PATRICK, of Galesburg, county of Knox, and State of Illinois, have invented a new and Improved Carving-Table; and I do hereby declare that the following is a full, clear, and exact description thereof, reference being had to the accompanying drawings, making a part of this specification, in which—

Figure 1 is a longitudinal section through my improved carving-table, taken in the vertical plane indicated by red line $x\,x$, Fig. 2. Fig. 2 is a top view of the carving-table. Fig. 3 is a horizontal section through red line $y\,y$, Fig. 1. Fig. 4 is a transverse section through the end of the carving-table taken at the point indicated by red line $z\,z$, Fig. 2.

Similar letters of reference indicate corresponding parts in the several figures.

The object of my invention is to warm and keep warm dishes or other vessels containing food for immediate use by exposing such vessels to a continued stream of heated water, which is so applied that a great number of dishes may be disposed over a large area and all subjected to a moist temperature which is nearly uniform, and which may be so maintained for any desired length of time, as will be hereinafter described.

In order to enable others skilled in the art to understand my invention, I will describe its construction and operation.

One great difficulty which is experienced in the use of carving-tables which have circulating currents of hot water applied to a number of dishes or vessels of any description is the difference in temperature which exists in the vessels and the rapid cooling of the water occasioned by its slow motion from one vessel to another. In such contrivances but few vessels can be employed, as the water gives off its heat so rapidly that when it enters the vessel which is most remote from that into which the boiling water is first introduced it is too cool to serve any useful purpose. To remedy this objection, I employ a number of vessels, $a\ b\ c\ d\ e\ f\ g\ h$, of gradually-decreasing depths, and connect these vessels by short pipes $i$, leading from one vessel into another throughout the entire series. The vessel $a$ is the shallowest of the series, and the vessel $h$ is the deepest. Thus when water is introduced into the vessel or pan $a$, it will run rapidly downward through the several vessels above mentioned into the deepest vessel $h$. This latter vessel $h$ is connected, by means of a pipe, $j$, with the boiler A, which in the present case consists of a pipe wound in a spiral form and arranged within a furnace, B. The pipe $j$ communicates with the lower end of the coil A, and the upper end of this coil communicates with the shallow vessel $a$ by means of a pipe, C. (Shown in Figs. 1 and 4.) The pan $a$ is arranged in such relation to the horizontal plane or the top of the coil A that this coil can be nearly filled with water by pouring water into the deepest pan $h$, and when properly supplied the water will rise in the pan $h$. Thus it will be seen that the apparatus can be charged with water and the proper equilibrium maintained with very little attention.

When heat is applied to the coil A and the expansion of the water in this coil takes place, the hot water rises and enters the vessel $a$ through pipe C, from whence it escapes into vessel $b$, thence into vessels $c\ d\ e\ f\ g\ h$, from which latter the water, which is now somewhat cooled, enters the boiler again at its lowest point. A complete circulation and rotation of the water is now established through all the pans, into the boiler, and from thence into the pans again, as indicated by the course of the arrows in Fig. 1.

The equilibrium of the water in the boiler being thus disturbed, a rapid circulation can be kept up as long as the heat and the supply of water in the boiler are maintained.

By my invention I cause the hot water, after entering the first or shallowest vessel $a$, to flow so rapidly through the succeeding pans that it loses very little heat, and consequently the temperature of the water in the deepest pan $h$ is almost as high as that in the pan $a$.

The water in its circulation or circuit through the several pans operates as a medium for the transmission of the heat from the furnace to the articles to be warmed, and in repassing through said furnace the water, which was partially cooled in its passage through the pans, will be again heated and again circulated through the pans.

By my invention all that portion of the table which supports the pans is kept comparatively cool, and the heat is confined chiefly to the vessels through which the hot water passes; consequently a very small volume of water is required to be heated for a large number of pans.

The table D, which sustains the several vessels or pans, may be made of wood or metal, and the pans may be applied to this table in the manner represented in the drawings, or in any other suitable manner.

If desirable, the pipe $j$, which leads downward from the bottom of the vessel $h$ into the lower end of the boiler A, may be extended backward and forward upon the horizontal base or shelf of the table, as shown in Figs. 1, 3, and 4, for the purpose of heating plates for table use.

Such articles as require most heat I apply to the vessels, $a$ $b$, nearest the receiving-pipe, while such as require little heat I apply to the deepest vessels, or those which are farthest from the source of heat, and which are covered closely by means of shallow pans $p$ $p$, as shown in Figs. 1 and 4.

Having thus described my invention, what I claim as new, and desire to secure by Letters Patent, is—

1. A carving-table which is provided with a series of pans of varying depths that communicate with each other and also with a boiler, substantially as described.

2. Distributing water of different temperatures through a series of pans by producing a circulation, substantially as herein described.

SAML. PATRICK.

Witnesses:
H. A. HOWARD,
H. W. BELDEN.